US008539228B1

(12) United States Patent  
Mason et al.

(10) Patent No.: US 8,539,228 B1  
(45) Date of Patent: Sep. 17, 2013

(54) MANAGING ACCESS TO A RESOURCE

(75) Inventors: W. Anthony Mason, Milford, NH (US); Peter G. Viscarola, Mont Vernon, NH (US); Mark J. Cariddi, Merrimack, NH (US); Scott J. Noone, Nashua, NH (US)

(73) Assignee: OSR Open Systems Resources, Inc., Amherst, NH (US)

( * ) Notice: Subject to any disclaimer, the term of this patent is extended or adjusted under 35 U.S.C. 154(b) by 1156 days.

(21) Appl. No.: 11/509,391

(22) Filed: Aug. 24, 2006

(51) Int. Cl.
*H04L 9/32* (2006.01)
*G06F 7/04* (2006.01)
*G06F 12/16* (2006.01)

(52) U.S. Cl.
USPC ........... 713/164; 713/165; 713/166; 713/176; 726/21; 726/27

(58) Field of Classification Search
USPC .................. 713/164, 165, 166, 176; 726/21, 726/27
See application file for complete search history.

(56) References Cited

U.S. PATENT DOCUMENTS

| | | | |
|---|---|---|---|
| 4,135,240 A | 1/1979 | Ritchie | |
| 4,959,811 A | 9/1990 | Szczepanek | |
| 4,984,153 A | 1/1991 | Kregness et al. | |
| 5,027,395 A | 6/1991 | Anderson et al. | |
| 5,488,701 A | 1/1996 | Brady et al. | |
| 5,506,983 A | 4/1996 | Atkinson et al. | |
| 5,530,850 A | 6/1996 | Ford et al. | |
| 5,537,588 A | 7/1996 | Engelmann et al. | |
| 5,551,003 A | 8/1996 | Mattson et al. | |
| 5,574,898 A | 11/1996 | Leblang et al. | |
| 5,606,983 A | 3/1997 | Monty et al. | |
| 5,652,879 A | 7/1997 | Harris et al. | |
| 5,664,178 A | 9/1997 | Sinofsky | |
| 5,706,504 A | 1/1998 | Atkinson et al. | |
| 5,715,441 A | 2/1998 | Atkinson et al. | |
| 5,734,861 A | 3/1998 | Cohn et al. | |
| 5,752,252 A | 5/1998 | Zbikowski et al. | |
| 5,757,915 A * | 5/1998 | Aucsmith et al. | 713/187 |
| 5,764,880 A | 6/1998 | Gerdt et al. | |
| 5,781,797 A * | 7/1998 | Crick et al. | 710/10 |
| 5,799,324 A | 8/1998 | McNutt et al. | |
| 5,802,344 A | 9/1998 | Menon et al. | |
| 5,815,707 A | 9/1998 | Krause et al. | |
| 5,832,515 A | 11/1998 | Ledain et al. | |

(Continued)

FOREIGN PATENT DOCUMENTS

EP 1320010 A2 6/2003
WO WO 2006/081508 A1 8/2006

OTHER PUBLICATIONS

Notice of Allowability issued on Dec. 17, 2008 in U.S. Appl. No. 11/505,582.

(Continued)

*Primary Examiner* — Michael Simitoski
(74) *Attorney, Agent, or Firm* — K&L Gates LLP

(57) ABSTRACT

Methods of managing access to at least one resource in a computer system. The methods may comprise the step of associating access rights with an application resource. The access rights may define a level of access to the resource granted to the application. The methods may also comprise the step of digitally signing the access rights and the application resource. In various embodiments, the associating may comprise incorporating the access rights into a stream of a file including the application resource. Also, in various embodiments, the associating may comprise incorporating the access rights into an extended attribute of a file including the application resource.

14 Claims, 7 Drawing Sheets

(56) References Cited

U.S. PATENT DOCUMENTS

| | | | |
|---|---|---|---|
| 5,857,207 A | 1/1999 | Lo et al. | |
| 5,873,097 A | 2/1999 | Harris et al. | |
| 5,923,878 A | 7/1999 | Marsland | |
| 5,991,893 A | 11/1999 | Snider | |
| 5,996,054 A | 11/1999 | Ledain et al. | |
| 6,006,227 A | 12/1999 | Freeman et al. | |
| 6,021,408 A | 2/2000 | Ledain et al. | |
| 6,021,509 A | 2/2000 | Gerdt et al. | |
| 6,038,668 A | 3/2000 | Chipman et al. | |
| 6,065,100 A | 5/2000 | Schafer et al. | |
| 6,079,047 A | 6/2000 | Cotugno et al. | |
| 6,101,186 A | 8/2000 | Craig | |
| 6,108,420 A * | 8/2000 | Larose et al. | 705/59 |
| 6,128,630 A | 10/2000 | Shackelford | |
| 6,148,368 A | 11/2000 | DeKoning | |
| 6,240,527 B1 | 5/2001 | Schneider et al. | |
| 6,260,036 B1 | 7/2001 | Almasi et al. | |
| 6,321,239 B1 | 11/2001 | Shackelford | |
| 6,336,164 B1 | 1/2002 | Gerdt et al. | |
| 6,347,397 B1 | 2/2002 | Curtis | |
| 6,366,987 B1 | 4/2002 | Tzelnic et al. | |
| 6,367,008 B1 | 4/2002 | Rollins | |
| 6,377,958 B1 | 4/2002 | Orcutt | |
| 6,381,682 B2 | 4/2002 | Noel et al. | |
| 6,418,509 B1 | 7/2002 | Yanai et al. | |
| 6,430,548 B1 | 8/2002 | Deis et al. | |
| 6,438,594 B1 | 8/2002 | Bowman-Amuah | |
| 6,449,688 B1 | 9/2002 | Peters et al. | |
| 6,490,664 B1 | 12/2002 | Jones et al. | |
| 6,526,570 B1 | 2/2003 | Click, Jr. et al. | |
| 6,529,909 B1 | 3/2003 | Bowman-Amuah | |
| 6,535,949 B1 | 3/2003 | Parker | |
| 6,577,254 B2 | 6/2003 | Rasmussen | |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,625,671 B1 | 9/2003 | Collette et al. | |
| 6,628,411 B2 | 9/2003 | Miller et al. | |
| 6,633,244 B2 | 10/2003 | Avery et al. | |
| 6,633,883 B2 | 10/2003 | Koskas | |
| 6,643,405 B1 | 11/2003 | Sako | |
| 6,643,652 B2 | 11/2003 | Helgeson et al. | |
| 6,654,851 B1 | 11/2003 | McKean | |
| 6,657,565 B2 | 12/2003 | Kampf | |
| 6,664,903 B2 | 12/2003 | Kugai | |
| 6,704,839 B2 | 3/2004 | Butterworth et al. | |
| 6,711,709 B1 | 3/2004 | York | |
| 6,732,125 B1 | 5/2004 | Autrey et al. | |
| 6,738,863 B2 | 5/2004 | Butterworth et al. | |
| 6,741,747 B1 | 5/2004 | Burns et al. | |
| 6,775,781 B1 | 8/2004 | Phillips et al. | |
| 6,782,319 B1 | 8/2004 | McDonough | |
| 6,785,768 B2 | 8/2004 | Peters et al. | |
| 6,795,640 B1 | 9/2004 | Honda | |
| 6,795,897 B2 | 9/2004 | Benveniste et al. | |
| 6,847,681 B2 | 1/2005 | Saunders et al. | |
| 6,856,993 B1 | 2/2005 | Verma et al. | |
| 6,901,403 B1 | 5/2005 | Bata et al. | |
| 6,944,619 B2 | 9/2005 | Gruenwald | |
| 6,947,556 B1 | 9/2005 | Matyas, Jr. et al. | |
| 6,983,456 B2 | 1/2006 | Poznanovic et al. | |
| 7,051,031 B2 | 5/2006 | Schein | |
| 7,085,766 B2 | 8/2006 | Keith, Jr. | |
| 7,100,047 B2 | 8/2006 | Stamons et al. | |
| 7,107,267 B2 | 9/2006 | Taylor | |
| 7,146,009 B2 | 12/2006 | Andivahis et al. | |
| 7,191,189 B2 | 3/2007 | Bhatti | |
| 7,340,581 B2 | 3/2008 | Gorobets et al. | |
| 7,392,383 B2 * | 6/2008 | Basibes et al. | 713/167 |
| 7,444,625 B2 | 10/2008 | Anwar et al. | |
| 7,487,363 B2 | 2/2009 | Alve et al. | |
| 7,502,713 B2 | 3/2009 | Hillier et al. | |
| 7,523,221 B2 | 4/2009 | Hillberg | |
| 7,530,016 B2 | 5/2009 | Sahota et al. | |
| 7,536,418 B2 | 5/2009 | Buchsbaum et al. | |
| 7,546,221 B2 | 6/2009 | Moon et al. | |
| 7,549,174 B1 * | 6/2009 | Falkner et al. | 726/29 |
| 7,702,995 B2 | 4/2010 | Sahota et al. | |
| 7,802,082 B2 | 9/2010 | Kruse et al. | |
| 7,930,756 B1 * | 4/2011 | Crocker et al. | 726/27 |
| 7,949,693 B1 | 5/2011 | Manson et al. | |
| 2002/0007456 A1 * | 1/2002 | Peinado et al. | 713/164 |
| 2002/0052868 A1 | 5/2002 | Mohindra et al. | |
| 2002/0073066 A1 | 6/2002 | Coutts et al. | |
| 2002/0143735 A1 | 10/2002 | Ayi et al. | |
| 2003/0110478 A1 | 6/2003 | Duesterwald et al. | |
| 2003/0123446 A1 | 7/2003 | Muirhead et al. | |
| 2003/0131251 A1 * | 7/2003 | Fetkovich | 713/193 |
| 2004/0015958 A1 * | 1/2004 | Veil et al. | 717/174 |
| 2004/0103202 A1 * | 5/2004 | Hildebrand et al. | 709/229 |
| 2004/0167916 A1 | 8/2004 | Basso et al. | |
| 2004/0181772 A1 * | 9/2004 | Pensak et al. | 717/100 |
| 2004/0186920 A1 | 9/2004 | Birdwell et al. | |
| 2004/0250247 A1 | 12/2004 | Deeths et al. | |
| 2005/0144189 A1 | 6/2005 | Edwards et al. | |
| 2005/0240966 A1 | 10/2005 | Hindle et al. | |
| 2005/0256878 A1 * | 11/2005 | Brown et al. | 707/10 |
| 2006/0031246 A1 | 2/2006 | Grayson | |
| 2006/0070076 A1 | 3/2006 | Ma | |
| 2006/0101025 A1 | 5/2006 | Tichy et al. | |
| 2006/0123250 A1 | 6/2006 | Maheshwari et al. | |
| 2006/0190417 A1 | 8/2006 | Hilkemeyer et al. | |
| 2006/0195476 A1 | 8/2006 | Nori et al. | |
| 2006/0277153 A1 | 12/2006 | Mason et al. | |
| 2007/0277234 A1 * | 11/2007 | Bessonov et al. | 726/10 |
| 2008/0134154 A1 | 6/2008 | Patel et al. | |
| 2009/0249277 A1 | 10/2009 | Prakash | |

OTHER PUBLICATIONS

Office Action issued on Mar. 19, 2008 in U.S. Appl. No. 11/145,433.
Office Action (Interview Summary) issued on May 23, 2008 in U.S. Appl. No. 11/145,433.
Office Action issued on Sep. 16, 2008 in U.S. Appl. No. 11/145,433.
Office Action issued on Sep. 8, 2008 in U.S. Appl. No. 11/505,582.
U.S. Appl. No. 11/505,582, filed Aug. 17, 2006.
U.S. Appl. No. 11/789,147, filed Apr. 24, 2007.
U.S. Appl. No. 11/844,102, filed Aug. 23, 2007.
Office Action issued on Jul. 20, 2007 in U.S. Appl. No. 11/145,433.
Office Action (Interview Summary) issued on Nov. 14, 2007 in U.S. Appl. No. 11/145,433.
Response to Nov. 14, 2007 Office Action (Interview Summary) filed Dec. 4, 2007 in U.S. Appl. No. 11/145,433.
Burrows et al., "On-line Data Compression in a Log-structured File System," proceedings of the Fifth International Conference on Architectural Support for Programming Languages and Operating Systems, Oct. 12-15, 1992, ACM Press, pp. 1-21.
Rosenblum, Mendel and John K. Ousterhout, "The Design and Implementation of a Log-Structured File System," ACM Transactions on Computer Systems, vol. 10, No. 1, Feb. 1992; pp. 26-52.
"Windows Streams—An Introduction to File System Streams," printed from http://www.osronline.com, The NT Insider, vol. 13, Issue 2, Mar.-Apr. 2006, Apr. 17, 2006, 6 pages.
"Sponsor Sessions," printed from http://microsoft.com/whdc/driverdevcon/ddctracks2005/d05_sponsors.mspx, updated Mar. 25, 2005, printed Apr. 25, 2006, 2 pages.
"Windows Driver Devcon 2005; Practical Challenges in Implementing Encryption/Compression Filters," Microsoft Windows Hardware & Driver Central, Microsoft Corporation, 2005, 21 pages.
Mac OS X ABI Mach-O File Format Reference, Oct. 3, 2006, 62 pages.
Office Action issued on Feb. 23, 2009 in U.S. Appl. No. 11/145,433.
Office Action issued on Aug. 3, 2009 in U.S. Appl. No. 11/145,433.
Office Action issued on Dec. 15, 2009 in U.S. Appl. No. 12/388,712.
Office Action (Interview Summary) issued on Feb. 1, 2010 in U.S. Appl. No. 11/145,433.
Office Action issued on Mar. 30, 2010 in U.S. Appl. No. 11/789,147.
Office Action issued on Mar. 2, 2010 in U.S. Appl. No. 11/844,102.
U.S. Appl. No. 12/388,712, filed Feb. 19, 2009.

Duncan, Geoff, "Man Buys Used iPod with U.S. Troop Data", Jan. 27, 2009, printed from http://digitaltrends.com/internatiorial/man-buys-used-ipod-with-us-troop-data/ (1 page).
Examiner's Answer issued on Jul. 7, 2010 in U.S. Appl. No. 11/145,433.
Office Action (Interview Summary) issued on Apr. 8, 2009 in U.S. Appl. No. 11/145,433.
Decision on Appeal issued on Jan. 29, 2013 in U.S. Appl. No. 11/145,433.
Oral Hearing Held Jan. 17, 2013 issued on Feb. 20, 2013 in U.S. Appl. No. 11/145,433.
Office Action issued on Feb. 3, 2011 in U.S. Appl. No. 11/789,147.
Notice of Allowance mailed May 26, 2011 in U.S. Appl. No. 11/789,147.
Notice of Allowance mailed Sep. 16, 2010 in U.S. Appl. No. 11/844,102.
Notice of Allowance mailed Jan. 20, 2011 in U.S. Appl. No. 11/844,102.
Notice of Abandonment under 37 CFR 1.53(f) or (g) mailed Oct. 11, 2011 in U.S. Appl. No. 12/985,923.
Office Action issued on May 20, 2010 in U.S. Appl. No. 12/388,712.
Notice of Allowance mailed Jul. 1, 2010 in U.S. Appl. No. 12/388,712.

* cited by examiner

MANAGING ACCESS TO A RESOURCE

BACKGROUND

Managing access to resources is becoming an increasingly important concern in modern computers and computer systems. Traditionally, access management is handled at the operating system level on a user-by-user or group basis. Each user of the computer or computer system is given a security level that determines which resources the user may access and manipulate. The user's level of access to resources is the same, regardless of which application the user runs. For example, the user may be granted either no access, read-only access, or read/write access as determined by the configuration settings for each specific resource. Although user-based security is widely used, it provides only a limited number of access options. For example, even read-only access rights typically allow a user to not only read a file, but also to print and/or copy the file. This may be insufficient in many applications including, for example, those where secrecy is important.

SUMMARY

In one general aspect, embodiments of the invention are directed to methods of managing access to at least one resource in a computer system. The methods may comprise the step of associating access rights with an application resource. The access rights may define a level of access to the resource granted to the application. The methods may also comprise the step of digitally signing the access rights and the application resource. In various embodiments, the associating may comprise incorporating the access rights into a stream or sub-file of a file including the application resource. Also, in various embodiments, the associating may comprise incorporating the access rights into an extended attribute of a file including the application resource. In various embodiments, access rights may be associated with a user as well as an application resource.

In another general aspect, embodiments of the invention are directed to methods of managing access to a resource in a computer system. The methods may comprise the steps of receiving a request from the application to access the at least one resource and determining whether access rights associated with the application includes a reference to a key for decrypting the resource. The methods may also include the step of providing the application with the key if the access rights include the reference.

In yet another general aspect, embodiments of the invention are directed to methods of managing access to a resource in a computer system. The methods may comprise receiving a request from an application to access the at least one resource. The methods may also comprise the step of reading the access rights associated with the application. The access rights may be stored in a stream of a file, and a component of the application may be stored in a second stream of the file. The methods may also comprise the step of providing the application with access to the at least one resource if the access rights indicate that the application is entitled to access the resource.

BRIEF DESCRIPTION OF THE FIGURES

Embodiments of the present invention are described herein, by way of example, in conjunction with the following figures, wherein.

DETAILED DESCRIPTION OF THE INVENTION

Various embodiments of the present invention may be employed to manage access to computer resources (e.g., data, executable images, encryption keys, etc.) on an application-by-application basis. For example, applications running on a computer or computer system may be given associated access rights. The access rights may define the level of access to the resources that is available to the applications (and therefore to a user of the applications). In various embodiments, the access rights and a component of the application may be digitally signed for verification purposes.

Figure 1:
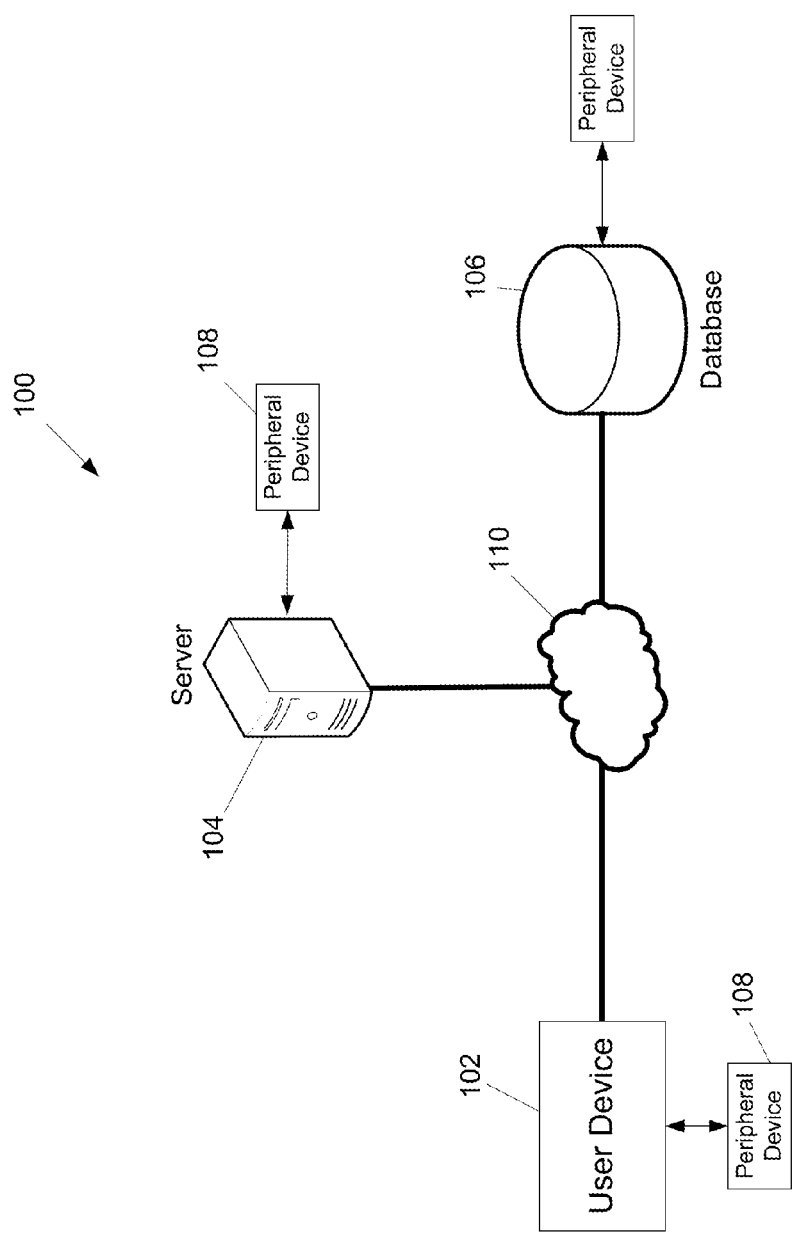
FIG. 1 shows a diagram of a computer system according to various embodiments of the present invention.

FIG. 1 shows a computer system 100 that may be used to implement various embodiments of the present invention. The computer system 100 may include various computing devices and/or constructs. For example, the computer system 100 may include one or more user devices 102, one or more servers 104, one or more databases 106, etc. In various embodiments, one or more of the devices 102, 104, 106 may have an associated peripheral storage device 108 (e.g., an external hard drive, a USB dongle, a USB pen drive, a flash memory card, etc.). The peripheral storage 108 may provide additional resource storage, as described in more detail below. A network 110 may provide connectivity between the devices 102, 104, 106 according to any suitable wired or wireless method.

The various devices 102, 104, 106, 108 of the computer system 100 may generally store resources and/or execute applications that allow users (not shown) of the system 100 to use and manipulate the resources. User devices 102 may include any kind of device that allows a user to access resources. Example user devices 102 include a desktop computer, a laptop computer, a handheld computer, a personal digital assistant (PDA), etc. The user devices 102 may be used to monitor and/or manipulate applications running on other components of the system 100 (e.g., the server 104), or access resources stored on other components of the system 100 (e.g., database 106). In various embodiments, however, user devices 102 may also store resources and/or execute applications.

Figure 2:
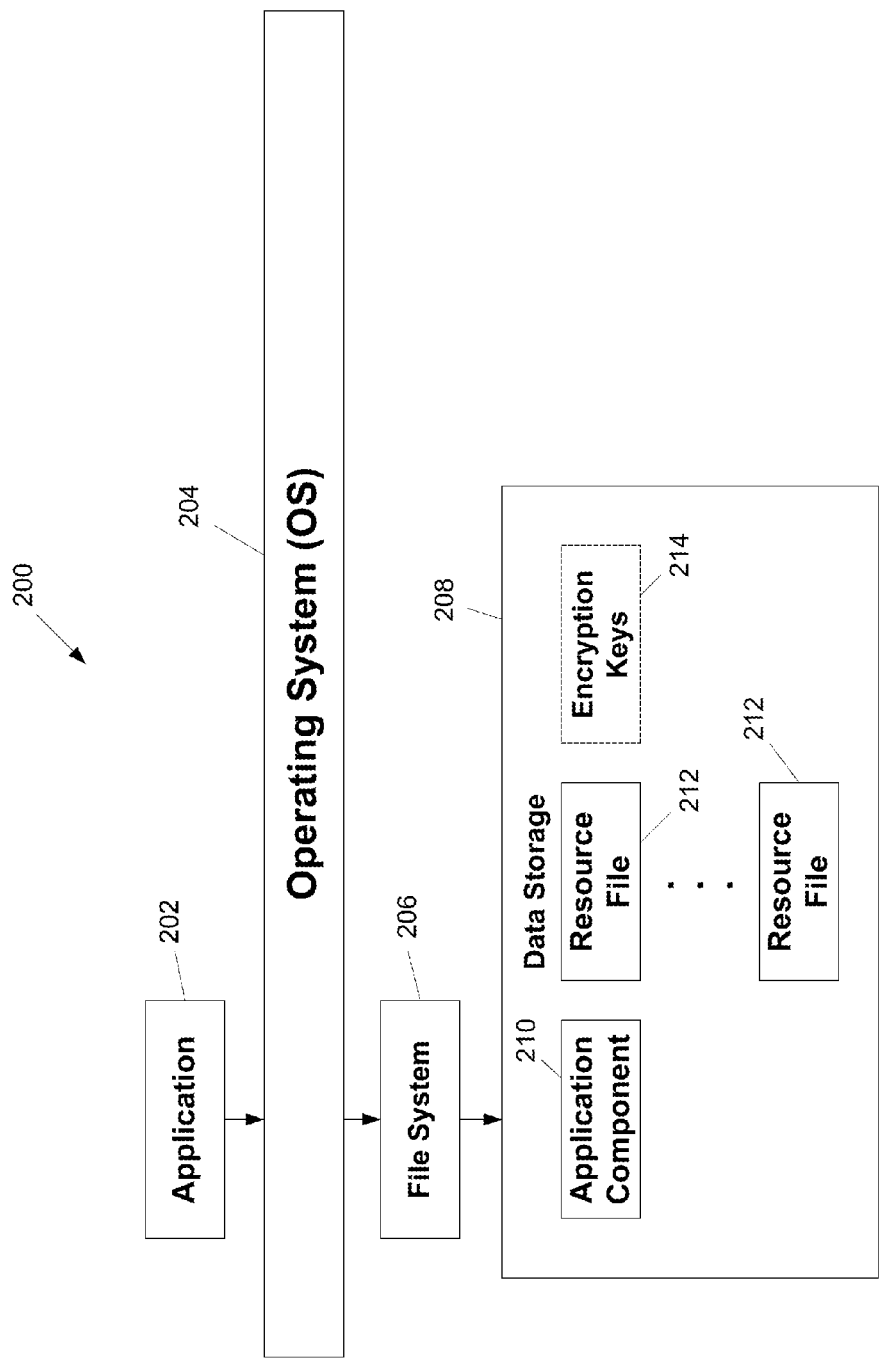
FIG. 2 shows a diagram of a system architecture according to various embodiments of the present invention.

FIG. 2 shows a block diagram, according to various embodiments, of a system architecture 200 that may be implemented on the computer system 100 to associate one or more access rights or privileges with an application. The system architecture 200 may include one or more examples of an application 202, an operating system 204, a file system 206 and data storage 208. Data storage 208 may include data files 210, 212, 214, as discussed below. It will be appreciated that the architecture 200 may be implemented on one component of the computer system 100 (e.g., a user device 102, a server 104, a database 106, etc.), or may be implemented across multiple components of the system.

The application 202 of the system architecture 200 may include a group of one or more software components executed by a processor or processors of one or more of the devices 102, 104, 106. The application 202 may perform at least one function such as, for example, providing e-mail service, providing word processing, providing financial management services, etc. The application 202 may perform functions by manipulating data. To acquire data for manipulation and output results, the application 202 may create "read requests" and "write requests" for particular data units. These requests may be handled by other components of the architecture 202 as described in more detail below. As described below, the application 202 may have associated access rights that define which resources (e.g., data and other applications) that the application 202 is authorized to access. It will be appreciated that the architecture 200 may, in various aspects, include additional applications (not shown).

Data utilized by the application 202 as well as other applications (e.g., resources) may be stored at data storage 208. Data storage 208 may include any kind of storage drive capable of storing data in an electronic or other suitable computer-readable format. In certain non-limiting embodiments, data storage 208 may include a single fixed disk drive, an array of disk drives, an array of disk drives combined to provide the appearance of a larger, single disk drive, a solid state drive, etc. Data storage 208 may be physically located at any device 102, 104, 106, 108 of the computer system 100. For example, data storage 208 may include various drives accessible over the network 110. In various embodiments, all or a part of data storage 208 may be located at database 106 and may be accessed through the network 110 by the other components, such as user devices 102, servers 104, etc.

File system 206 may be an organization system for logically and physically organizing data present at the data storage 208. In various non-limiting embodiments, the file system 206 may be a native file system included with the operating system 204, described below, or a third party file system. The file system 206 may organize data units into data files, and manage the location of data files in data storage 208. Each data file may include one or more data units. The file system 206 may be, for example, specific to a computer device 102, 104, 106 or to particular drives making up data storage 208. In various embodiments, a single file system 206 may manage associations between data files and physical locations for data storage 208 located across the computer system 100. The file system 206 may be any suitable file system including, as non-limiting examples, File Allocation Table 16 (FAT16), File Allocation Table 32 (FAT32), NTFS, High Performance File System (HPFS), UNIX file system (UFS), XFS, journaled file system (JFS), Universal Data Format File System (UDFS), CD-ROM File System (CDFS), Enhanced File System (EFS), SGI XFS, Clustered XFS (CXFS), HFS, VxFS, Raw File System (RawFS), Local File System (DCE/LFS), etc.

Interaction between the application 202 and the data storage 208 may be facilitated by the operating system 204. The operating system 204 may be any suitable operating system. For example, in various non-limiting embodiments, the operating system 204 may be any version of MICROSOFT WINDOWS, any UNIX operating system, any Linux operating system, OS/2, any version of Mac OS, etc. Each computer device 102, 104, 106, 108 may run its own instance of an operating system 204. The devices 102, 104, 106 of the computer system 100 may in various embodiments run the same type of operating system 204 or different types. The operating system 204 may provide services to the application 202 that facilitate the application's 202 functions. For example, the operating system 204 may allow the application 202 to access and manipulate data units stored at data storage 208. The operating system 204 may service read or write requests from the application 202, for example, by accessing local or remote data storage 208 through the file system 208.

Figure 3:
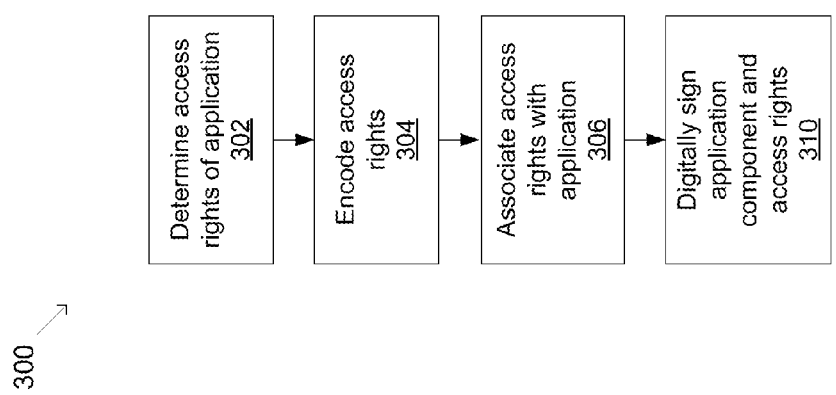
FIG. 3 shows a process flow for associating access rights with an application according to various embodiments of the present invention.

FIG. 3 shows a process flow 300, according to various embodiments, for associating access rights with an application 202. The access rights may be determined at step 302. In various embodiments, the access rights may define, for example, a resource or resources (e.g., stored at data storage 208) that the application 202 is authorized to access and/or edit, and the degree to which the application may access and/or edit the resources. For example, it may be desirable to allow the application 202 to access certain data (e.g., a DLL, a document, etc.), and/or cause the execution of certain executable images (e.g., subroutines associated with the application 202, complimentary applications, etc.). In various embodiments, resources may be stored at data storage 208 as one or more resource files 212.

It will be appreciated that the access rights may be expressed in various suitable ways. The particular expression may depend on the set-up of the computer system 100 and architecture 200. For example, in various embodiments, the access rights may include a generalized access setting for the application 202. The generalized access setting may define a level of access to the resources of the system 100 and/or the architecture 200. In various embodiments, the generalized access level may be predefined by the operating system 204, or other component of the system 100 or architecture 200. Existing operating systems often define generalized access settings, (e.g., administrator, power user, user, etc.), with each access setting corresponding to a predetermined level of access to resources. For example, an application or user having administrative access may have read and write access to all resources, while applications or users having other generalized access levels may have less access.

Also, in various embodiments, the access rights may allow the application 202 to use encryption keys 214 necessary to access desired resources. The resources may be encrypted according to any suitable encryption method (e.g., block substitution methods, dual-key encryption algorithms, etc.). In various embodiments, different resources or sets of resources may be encrypted by different encryptions keys or sets thereof. The access rights may allow the application 202 to access the encryption key or keys that are necessary to decrypt the resources that the application 202 is entitled to access. In various embodiments, the encryption keys may be stored at data storage 208, for example, at an encryption key database 214, or at a peripheral device 108, such as a USB dongle. The access rights may include security log-in and/or authentication data (e.g., a digital certificate), that allows the application to access the encryption key server and/or database 214 to retrieve the appropriate encryption key or keys. In various embodiments, the access rights associated with the application 202 may include the appropriate encryption key or keys. For example, the access rights and/or the appropriate encryption key or keys may be stored as a stream or attribute of the application resource 210, as discussed in more detail below.

At step 304, the access rights determined at step 302 may be encoded, or reduced to a data unit that can be associated with the application 202. It will be appreciated that the data unit may be expressed in any suitable format including, for example, a binary format, a Security Descriptor Definition Language (SDDL) script, an Extensible Markup Language (XML) script, etc.

Figure 6:
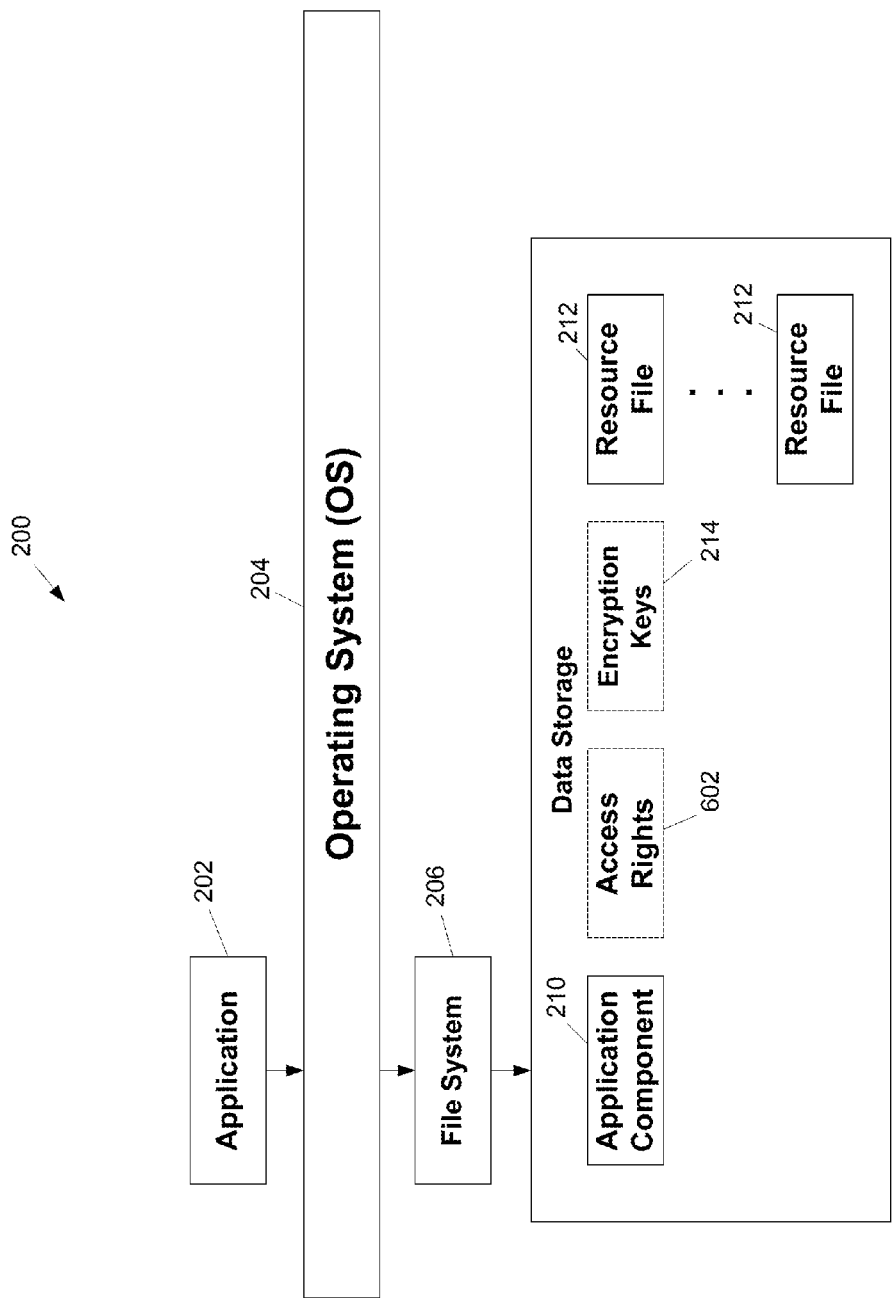
FIG. 6 shows a diagram of a system architecture according to various embodiments of the present invention.

The access rights may be associated with the application 202 at step 306. In various embodiments, the access rights may be associated with the application 202 by associating the data unit representing the access rights with an application resource 210. The application resource 210 may be, for example, an executable image, a dynamically linked library (DLL), a script or other data unit associated with the application 202. The access rights may be associated with the application resource 210 according to any suitable method. For example, the access rights may be incorporated into the file including the application resource 210 such as a stream or attribute. In various embodiments, the access rights may be placed into a separate file 602, as shown by FIG. 6. The separate file 602 may then be linked with the application resource 210 according to any suitable method.

Figure 4:
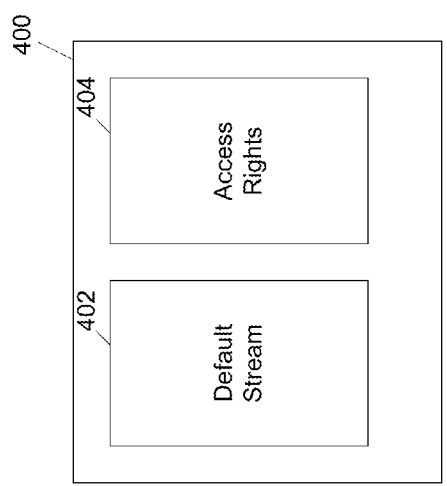
FIGS. 4 and 5 show diagrams of files according to various embodiments of the present invention.
Figure 5:
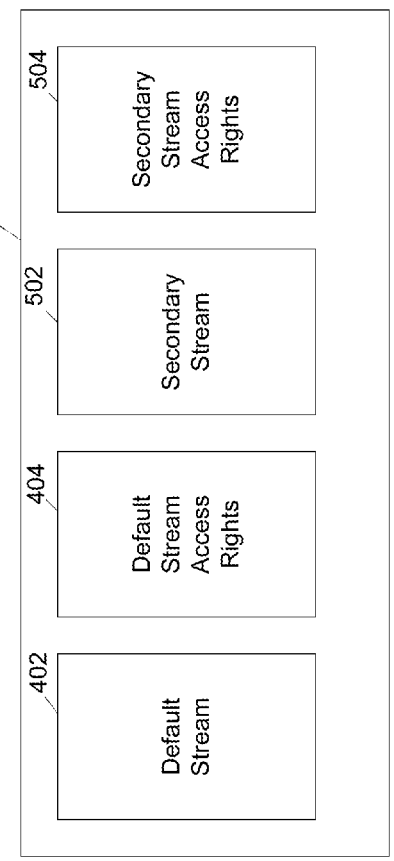

In various embodiments, the access rights may be associated with the application resource 210 by placing a data unit representing the access rights into a stream or sub-file of the file including the application resource 210. In a MICROSOFT WINDOWS environment, this concept may be called a "file system filter driver;" in a UNIX/Linux environment, it may be called a "layered" or "stackable" file system; and in MICROSOFT DISK OPERATING SYSTEM (MS-DOS), it may be called an INT21 or INT13 driver. FIG. 4 shows an exemplary file 400 including two streams or streams 402 and 404. Stream 402 may include a data unit representing the application resource 210, while the stream 404 may include the data unit representing access rights. It will be appreciated that in systems supporting streams (e.g., multiple sub-files within a single file), a single file may include more than one application resource 210. In this case, as shown in FIG. 5, an access rights stream 404, 504 may be included in the file 500 for each separate application resource stream 402, 502.

Also, in various embodiments, the access rights may be included as an extended attribute of the application resource file 210. Support for extended attributes may be implemented in any suitable way, with extended attribute data stored within or outside of the application resource file 210. For example, the OS/2 operating system allows support for extended attributes in the FAT file system by storing extended attribute data in a hidden file in the root directory of a folder or drive. Each file having extended attributes is then modified to include a pointer to the location in the hidden file including its extended attribute data. In various embodiments, the access rights may be otherwise stored as an external file 602, shown in FIG. 6. The access rights file 602 may then be associated with the application resource 210 by location or other methods. For example, the access rights file 602 may be placed at a location associated with the application resource file 210. In various embodiments, access rights files, such as file 602, may be kept at a central database or other location. Also, in various embodiments, the access rights file 602 may be named in a way that corresponds to the application 202 or application resource 210 that it is associated with (e.g., an application "program.exe" may have a access rights file called "program.isc."). Also, the application resource 210 and access rights may be associated by the digital signing process described hereinbelow.

At step 310, the application resource 210 and access rights may be digitally signed together. In this way, the access rights may be secured, as modifying the access rights after signing will destroy the validity of the digital signature. In various embodiments where the access rights are included in the same file as the application resource 210, the digital signing may involve digitally signing the application resource file 210. In embodiments where the access rights are stored in a separate file, then both the application resource file 210 and the access rights file 602 may be digitally signed together. The operating system 204 or other architecture component (e.g., security driver 802 discussed below) may verify the digital signature to determine whether the access rights have been modified, inadvertently or maliciously, to change the access level of the application 202.

The application resource 210 and access rights may be digitally signed according to any known method or configuration. For example, in various embodiments, the component 210 and access rights may be signed, and later verified, by authorized entities within the computer system 100. Each authorized entity may have an associated digital certificate. The digital certificates of authorized entities may be kept at a central location or certificate store. In various embodiments, security may be enhanced by placing the certificate store on a peripheral device 108, such as, for example, a USB dongle.

Figure 7:
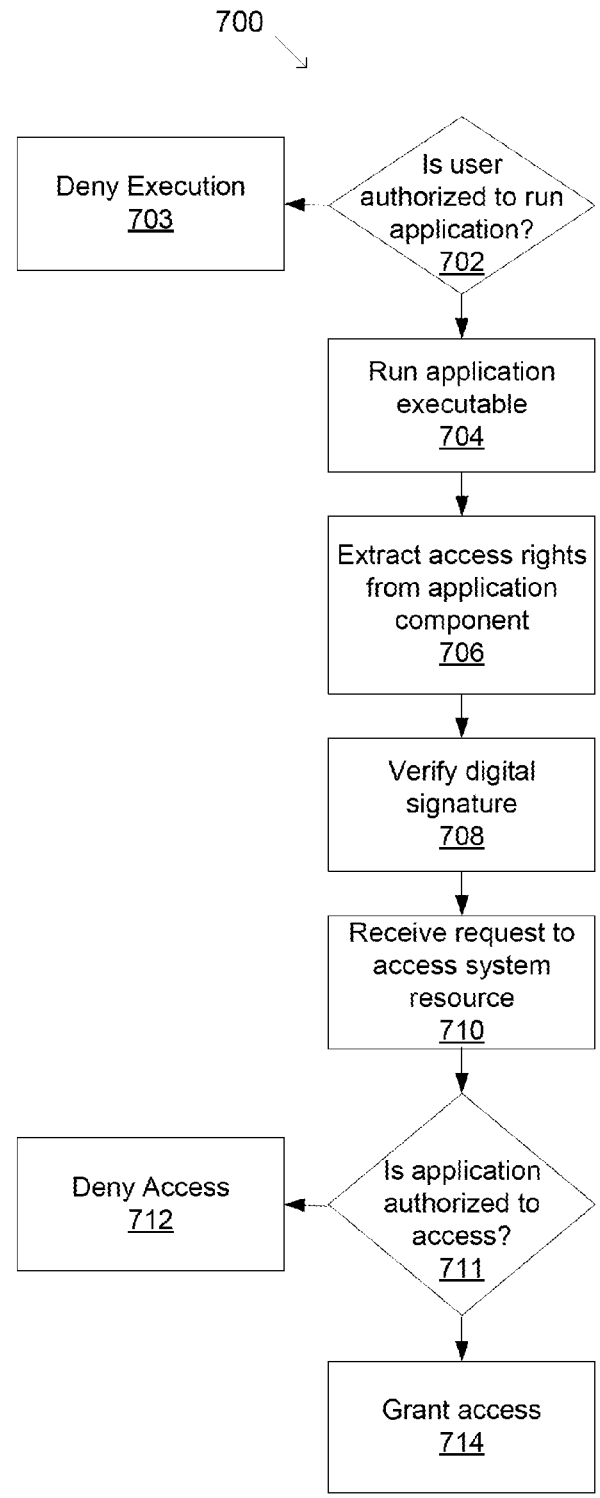
FIG. 7 shows a process flow for accessing a resource according to various embodiments of the present invention.

FIG. 7 shows a process flow 700 for executing the application 202 and granting the application 202 a level of access to resources. It will be appreciated that although methods are disclosed for associating access rights with an application, various embodiments may include supplemental user-based security. For example, at step 702, it may be determined whether a user (e.g., a user logged on to a user machine 102) has sufficient privileges in the computer system 100 to run the application 202. If the user lacks sufficient privileges, then execution of the application 202 may be denied at step 703. If the user has sufficient privileges, then the application executable may be run at step 704. The application executable may be, for example, the application resource 210 described above. Running the application executable may cause the application 202 to launch, as shown in FIG. 2.

At 706, the access rights associated with the application resource 210 may be extracted. For example, in embodiments where the access rights are stored in a stream 404, 504, the stream may be read and the data unit including the access rights extracted. In embodiments where the access rights are stored in a separate file associated with the application resource 210, the separate file may be located and read. The digital signature of the application resource 210 and access rights may be verified at step 708. Verifying the digital signature may involve comparing the application resource 210 and access rights, as signed, to some indicator (e.g., a digital certificate, public key, etc.) of all of the authorized entities permitted to sign the data units. If the verification of the application resource 210 and the access rights fails, it may indicate that the access rights have been corrupted. In this case, the application may not be granted access to at least some resources.

At step 710, the application 202 may make a request to access resources. The request may be a read request, where the application 202 asks to view data, and/or a write request where the application 202 asks to modify data. At step 711, it may be determined whether the access rights indicate that the application 202 is entitled to access the requested resources. For example, in embodiments where the resources are encrypted, it may be determined if the appropriate encryption key and/or authorization to access the appropriate encryption key is included in the access rights. In embodiments where the access rights include a privilege setting for the application 202, it may be determined whether the privilege setting allows the level of access requested. If the application 202 is not entitled to the level of access requested, then the access request may be denied at step 712. In various embodiments, where the resources are encrypted, if the access rights do not entitle the application 202 to access the appropriate encryption key, the requested resource may be delivered to the application 202 anyway, albeit in encrypted and therefore unusable form. If the application 202 is entitled to the level of access requested, then the requested resource may be forwarded to the application 202 and/or edited as requested at step 714.

Figure 8:
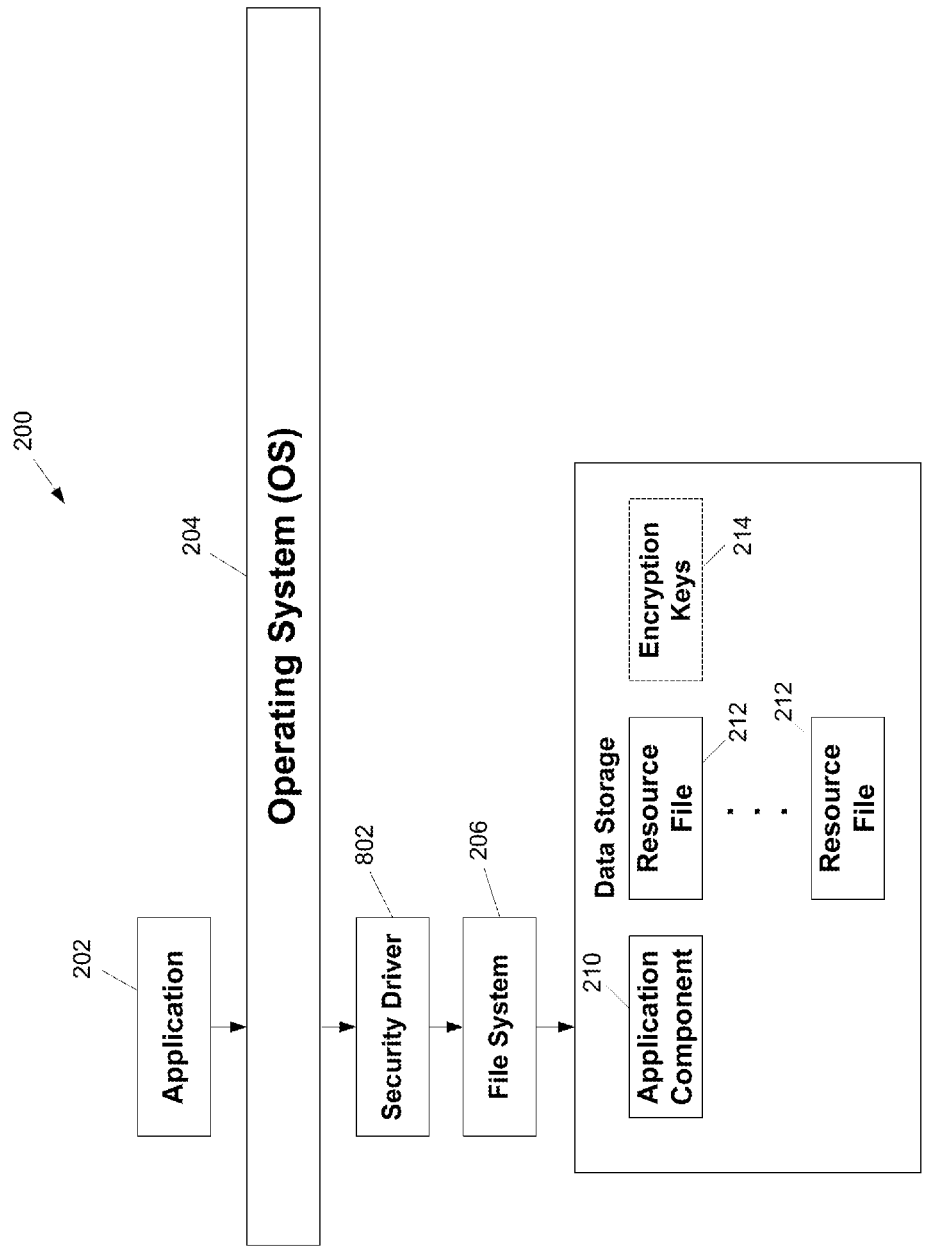
FIG. 8 shows a diagram of a system architecture according to various embodiments of the present invention.

In various embodiments, the functionality necessary to implement process flows 300 and 700 may be inherent in the operating system 204. It will be appreciated, however, that the methods of process flows 300 and 700 may be implemented on operating systems 204 lacking such functionality by utilizing one or more security drivers, such as security driver 802, shown in FIG. 8. The security driver 802 may be logically positioned between the application 202 and data storage 208 and may perform various functions to support associating access rights with an application. For example, in various embodiments, the security driver 802 may provide support for data streams or streams in the system 100. This may involve intercepting read and write requests from the application 202 and data storage 802. The security driver 802 may then read and/or write data units to one or more streams within a file. The file may then be written or retrieved from data storage 208.

Also, in various embodiments, the security driver 802 may facilitate the associating of an access rights with application resource 210. For example, in embodiments where the access rights are stored as a separate file 602, the security driver 802 may store the access rights file 602 at the appropriate location and retrieve it when necessary. The security driver 802 may also facilitate the digital signing and subsequent verification of the access rights. For example, the security driver 802 may direct the access rights and application resource 210 to an authorized entity for signature. In various embodiments, the security driver 802 may be an authorized entity. The security driver 802 may also have the ability to verify a digital signature previously applied to an access rights and application resource 210. The security driver 208 may also facilitate access rights or privileges while the application 202 is running. For example, the security driver 208 may intercept read requests and write requests from the application 202. The security driver 208 may then determine whether the application is authorized to make the requests and grant them (e.g., by passing them along to the data storage 208 or operating system 204, by providing the application 202 with a key, etc.), only when an application's 202 access rights indicate that it is entitled to the requested access, for example, as shown in process flow 700.

As used herein, the term "data unit" refers to a group of related data. As used herein, the term "data file" refers to an organizational unit of data. For example, a data file may include one or more data units. In various non-limiting embodiments, a data file may be an application data file, a database record or a file containing some or all of an executable image, such as an application program, code library, device driver, operating system image file, etc. As used herein, the terms "sub-file" and "stream" refer to an organizational unit of data organized within a data file. For example, a stream may include one or more data units.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system," and the like, may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The described systems may include various modules and/or components implemented as software code to be executed by a processor(s) of the systems or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

We claim:

1. A computer-implemented method of managing access to a plurality of resources in a computer system, the method comprising:

associating first and second access rights with an application resource by a security driver separate from an operating system of the a computing device of the computer system, wherein the computer system comprises at least one processor and operatively associated memory, wherein the security driver is executed by the computing device and logically positioned between an application associated with the application resource and a data storage of the computing device, wherein the application is executed by the computing device, wherein the first access right defines a level of access granted to the application to a first resource selected from the plurality of resources, wherein the second access right defines a level of access granted to the application to a second resource selected from the plurality of resources, wherein the first access right comprises first authentication data for allowing the application access to an encryption key store to retrieve a first encryption key corresponding to the first resource and stored at the encryption key store in response to a first request from the application to access the first resource, wherein the encryption key store is located at a second computing device of the computer system,
wherein the second access right comprises second authentication data for allowing the application to access the encryption key store to retrieve a second encryption key corresponding to the second resource and stored at the encryption key store in response to a second request from the application to access the second resource, and
wherein the associating comprises incorporating the first access right, the second access right and the application resource in a single file; and
digitally signing the first access right, the second access right and the application resource by the security driver with a single digital signature.

2. The method of claim 1, wherein the associating comprises incorporating the first and second access rights into at least one stream of the file including the application resource.

3. The method of claim 2, wherein the operating system of the computer system includes support for streams.

4. The method of claim 1, wherein the access rights comprises data organized according to at least one of a binary format, an Extensible Markup Language (XML) script, and a Security Descriptor Definition Language (SDDL) script.

5. The method of claim 1, wherein the first access right comprises a privilege setting within the computer system to be given to the application.

6. The method of claim 1, wherein the first access right comprises a reference to a key for decrypting the at least one resource.

7. The method of claim 1, wherein the digital signing is performed by an authorized entity within the computer system.

8. The method of claim 1, wherein the plurality of resources includes at least one of the group consisting of a data unit and an executable.

9. A computer implemented method of managing access to a plurality of resources in a computer system, the method comprising:
receiving a request from an application executed by a computing device of the computer system to access a first resource selected from the plurality of resources;
determining, by a security driver executed by the computing device, whether a first access right associated with the application includes data for allowing the application to access to an encryption key store to retrieve a first encryption key stored at the encryption key store for decrypting the first resource, wherein the security driver is, separate from an operating system of the computing device, and logically positioned between the application and a data storage of the computing device, wherein the encryption key store is located at a second computing device of the computer system, and wherein the computer system comprises at least one processor and operatively associated memory;
verifying by the security driver a single digital signature of an indication of at least the first access right and a component of the application;
providing the application with the first encryption key when the first access right includes the data and the single digital signature is verified;
receiving a second request from the application to access a second resource selected from the plurality of resources;
determining, by the security driver, whether a second access right associated with the application includes data for allowing the application to access an encryption key store to retrieve a second encryption key stored at the encryption key store for decrypting the second resource, wherein the single digital signature is also of an indication of the second access right, wherein the first access right, the second access right and the component of the application are included in a single file;
providing the application with the second encryption key.

10. The method of claim 9, further comprising:
receiving a request to execute the application; and
verifying if an originator of the request is authorized to execute the application.

11. The method of claim 9, wherein the first access right comprises authentication information for accessing the encryption key store.

12. The method of claim 9, wherein the first access right, the second access right, and the component of the application are included in separate streams of the single file.

13. The method of claim 9, wherein the plurality of resources comprises at least one of the group consisting of a data unit and an executable.

14. A method of managing access to a plurality of resources in a computer system, the method comprising:
receiving a request from an application executed by a computing device of the computer system to access a first resource selected from the plurality of resources;
reading a first access right of the application by a security driver separate from an operating system of the computing device, wherein the computer system comprises at least one processor and operatively associated memory, wherein the security driver is executed by the computing device and logically positioned between an application associated with the application resource and a data storage of the computing device, wherein the first access right is stored in a stream of a file, wherein a component of the application is stored in a second stream of the file, wherein the first access right comprises data for allowing access to an encryption key store to retrieve a first encryption key corresponding to the first resource, and wherein the encryption key store is located at a second computing device of the computer system;
verifying, by the security driver, the first access right of the application, wherein verifying the first access right comprises verifying a digital signature of an indication of the first access right and the component of the application; and
providing the application with access to the first resource when the digital signature is verified and when the first access right indicate that the application is entitled to access the first resource, wherein the providing is performed by the security driver, and wherein the providing comprises:
utilizing the first access right to allow access to the encryption key store to access the encryption key store and retrieve the first encryption key;
providing the first encryption key to the application;
receiving a request from the application for a second resource selected from the plurality of resources;
reading a second access right of the application by the security driver, wherein the second access right is stored in the stream of the file, and wherein the second access right comprises data for allowing access to the encryption key store to retrieve a second encryption key corresponding to the second resource;
verifying, by the security driver, the second access right of the application, wherein verifying the second access right comprises verifying the digital signature of the indication of the second access right, the component of the application, and an indication of the second access right; and providing the application with the second resource when the digital signature is verified when the second access right indicates that the application is entitled to access the second resource, wherein the providing is performed by the security driver, and wherein the providing comprises:

utilizing the second access right to allow access to the encryption key store to retrieve the second encryption key; and providing the second encryption key to the application.

* * * * *

UNITED STATES PATENT AND TRADEMARK OFFICE
CERTIFICATE OF CORRECTION

PATENT NO. : 8,539,228 B1  
APPLICATION NO. : 11/509391  
DATED : September 17, 2013  
INVENTOR(S) : Mason et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1236 days.

Signed and Sealed this
Tenth Day of February, 2015

Michelle K. Lee
*Deputy Director of the United States Patent and Trademark Office*